United States Patent [19]

Akahane et al.

[11] Patent Number: 5,135,694
[45] Date of Patent: Aug. 4, 1992

[54] ELECTRONIC DEVICE WRISTBAND

[75] Inventors: Fumiaki Akahane; Kazunori Miyashita, both of Suwa, Japan

[73] Assignee: Seiko Epson Corporation, Japan

[21] Appl. No.: 611,411

[22] Filed: Nov. 9, 1990

[30] Foreign Application Priority Data

| Nov. 10, 1989 | [JP] | Japan | 1-292635 |
| Dec. 18, 1989 | [JP] | Japan | 1-327612 |
| Feb. 27, 1990 | [JP] | Japan | 2-19110[U] |
| Jul. 10, 1990 | [JP] | Japan | 2-73167[U] |

[51] Int. Cl.$^5$ ............. B29C 39/30; B29C 39/18; B29C 45/14; B29C 45/16
[52] U.S. Cl. .................. 264/138; 264/229; 264/272.11; 264/272.15; 264/273; 264/279.1; 264/328.1
[58] Field of Search .......... 264/220, 229, 271.1, 264/272.11, 272.15, 273, 279.1, 138, 163; 427/409

[56] References Cited

U.S. PATENT DOCUMENTS

| 2,500,598 | 3/1950 | Axelrod | 264/220 |
| 3,088,847 | 5/1963 | Pines | 427/409 |
| 3,498,824 | 3/1970 | Chadha | 427/409 |
| 3,505,099 | 4/1970 | Neuroth | 427/409 |
| 3,686,731 | 8/1972 | Koori et al. | 427/409 |
| 3,976,740 | 8/1976 | Klingler | 264/229 |
| 4,713,808 | 12/1987 | Gaskill et al. | 370/93 |
| 4,808,483 | 2/1989 | Nakasuji et al. | 427/409 |
| 4,884,252 | 11/1989 | Teodoridis et al. | 368/10 |

FOREIGN PATENT DOCUMENTS

| 0339482 | 2/1989 | European Pat. Off. |
| 0089202 | 5/1983 | Japan |
| 0252002 | 10/1988 | Japan |

Primary Examiner—Willard Hoag
Attorney, Agent, or Firm—Raymond J. Werner

[57] ABSTRACT

A method of forming an integral intermediate layer in a flexible single injection molded component is disclosed. According to the method a strip comprising the sandwiched layer is securely positioned within a molding cavity. During injection of the mold material a tensile force is applied throughout the strip in a plane orthogonal to a critical component direction. The method is particularly suited for the fabrication of wrist mounted electronic devices having an electrical connection to a conductive member integrally housed within a molded wristband.

13 Claims, 8 Drawing Sheets

ELECTRONIC DEVICE WRISTBAND

BACKGROUND OF THE INVENTION

The present invention relates generally to electronic devices such as timepieces, pagers, radio receivers or the like and, particularly, to such devices in combination with wristbands manufactured to have integrally formed electrically conductive members.

Wrist worn electronic devices have limited space for mounting components. In such devices it is therefore desirable that the wristband segments receive selected components. In wristwatch-style radio receivers, for example, the wristband interior is designed to include electrically conductive plates or film which define an antenna around the wrist. Such wristband antennas are disclosed, for example, in Gaskill, U.S. Pat. No. 4,713,808, the disclosure of which is hereby incorporated by reference.

An antenna integrally formed within a wristband interior can be manufactured by means of injection molding. Two-stage injection molding has been employed, for example, to include an integral electrode in pulsemeter wristbands. To accurately position an electrode in a wristband, a first half-width slice of the wristband is injection-molded and an electrically conductive member placed on the inner side surface. The opposing half-width wristband slice is injection-molded integrally to the inner side surface of the first half segment so as to sandwich the conductive member between the first and second half-width slices.

Since a wristband must have sufficient flexibility to fit around the wrist, the electrode member should be thin so as not to compromise overall wristband flexibility. The flexibility of the electrode member has required two-stage injection molding. Single injection molding of wristbands having a flexible electrically conductive member have proven to be unsatisfactory insofar as the flexible member cannot resist the pressure of the injected molding material, thereby causing it to deform or move from a desired initial position and adversely affect desired wristband properties.

Two-stage injection molded wristbands also tend to exhibit weak bonding strength between the molded half segments and between the molded half segments and the inserted electrically conductive member. Such bonding difficulties lead to separation of the half segments from each other or separation of the electrically conductive member from the molded wristband segment. Hence, prior art wristbands manufactured by two-stage injection molding lack a long service life.

Accordingly, it is an object of the present invention to provide a method of manufacturing an electronic device wristband having an electrically conductive member securely retained in proper position by single injection molding.

Another object of the present invention is to provide a method of inserting and securely fixing an electrically conductive member in a molded wristband.

Still another object of the present invention is to provide an electronic device wristband formed by single injection molding and having an electrically conductive member properly positioned and securely bonded therein.

SUMMARY OF THE INVENTION

According to the present invention, single injection molding is employed to form an electronic device wristband having an integrally inserted electrically conductive member. The conductive member is placed in a mold cavity in a tensile condition to prevent deformation or deflection of the electrically conductive member by the pressure of the molding material injected into the cavity. Following injection molding of the wristband, the tensile force applied to the conductive member is released. Therefore, according to the method of the present invention, the conductive member is held uniformly at a desired position, particularly, relative to the thickness dimension of the wristband, by means of the applied tensile force. Since single injection molding is employed, the conductive member is firmly retained within the wristband.

The electrically conductive member is preferably formed to include a tag designed to project beyond the longitudinal end of the molded wristband. The tag receives and transmits a tensile force to the conductive member in the mold cavity. The tag is removable from the conductive member following injection molding of the wristband. It is desirable that the tag be severed from the conductive member inside the molded wristband so as not to expose an unremoved tag portion at the wristband end. This is accomplished by forming a groove on the conductive member proximate the tag.

In the preferred embodiment, the electrically conductive member includes a projection at one longitudinal end. The conductive member is inserted into the molding cavity with the projection nipped between the pair of molds defining the cavity. The mold which defines the inner surface or wrist side of the wristband is formed with a gate through which the molding material is injected into the cavity. The gate is positioned where the projection is nipped. Since the mold gate is marked on the longitudinal end of the inner wristband side, the outer appearance of the wristband is not degraded by any mark remaining on the wristband.

The electrically conductive member is preferably formed with a plurality of holes arranged longitudinally to enhance bonding strength between the member and the molded material. In addition, the electrically conductive member may be coated with adhesive to increase bonding of the member to the molded material.

In another aspect of the present invention, an electronic device wristband is formed by single injection molding with an integral electrically conductive member incorporated within the wristband. The electrically conductive member is tensioned during the molding process to resist deformation or deflection by the force of the molding material injected into the cavity of the mold.

Other objects and attainments together with a fuller understanding of the invention will become apparent and appreciated by referring to the following description and claims taken in conjunction with the accompanying drawings.

DESCRIPTION OF THE INVENTION

Figure 1:
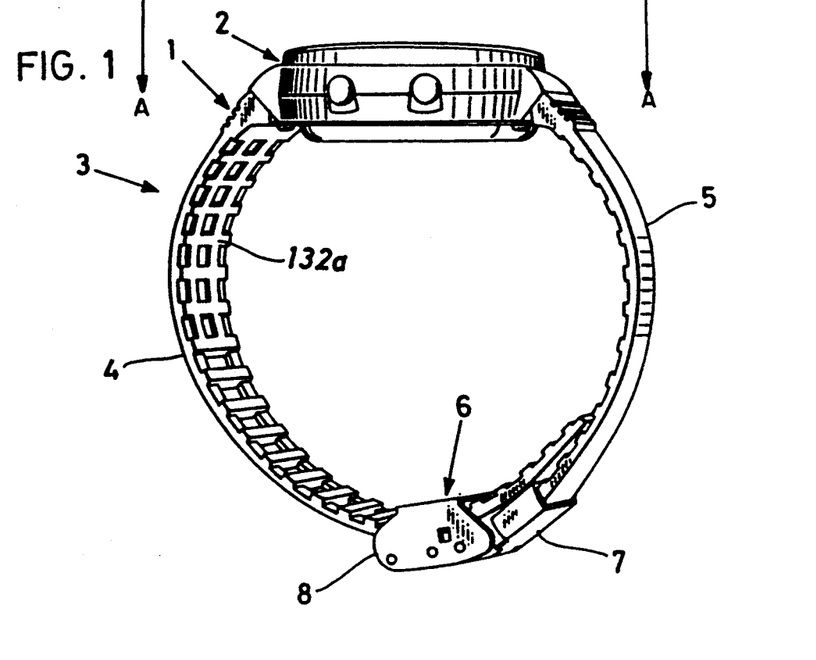
FIG. 1 is a perspective view of an exemplary combination of an electronic device and watchband assembly of the present invention.
Figure 2:
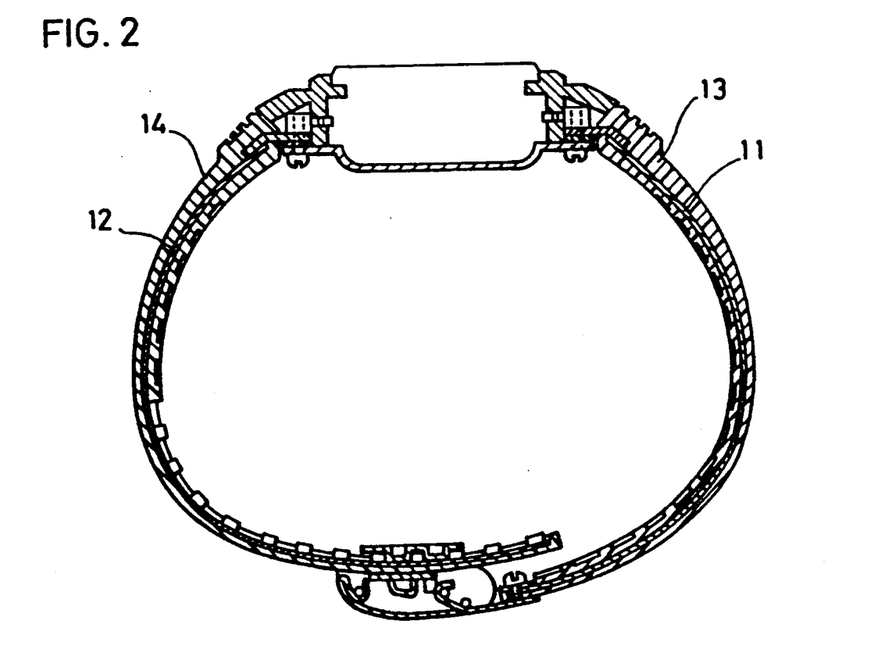
FIG. 2 is a longitudinal cross-section taken along line A—A of FIG. 1.
Figure 3:
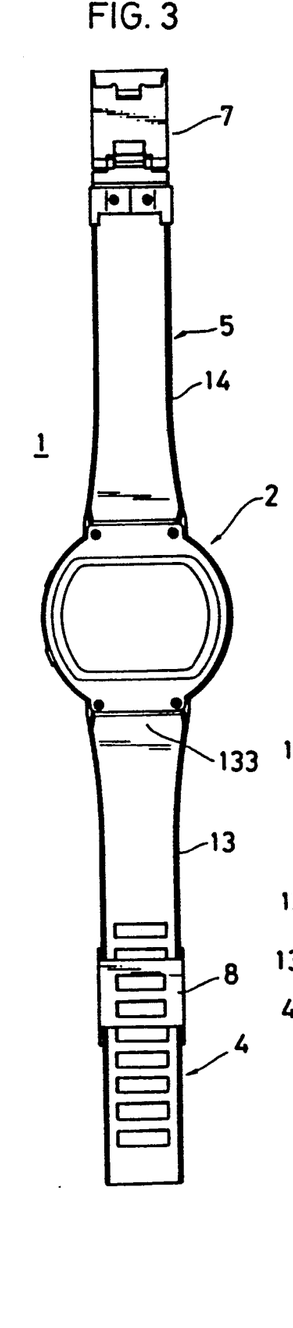
FIG. 3 is an inner-side plan view of the combination of FIG. 1.

Referring to FIGS. 1—3, a wrist-mounted paging receive 1 having a single injection molded wristband 3 manufactured according to the present invention is shown. The receiver 1 includes a radio receiver, not shown, within receiver housing 2 mounted to a wristband assembly. The receiver case 1 is made of an insulating material such as an injection molded rigid plastic. The wristband assembly comprises a wristband 3 having first and second wristband segments 4, 5, respectfully, and metal clasp 6. The clasp includes first and second portions, 7, 8 fixed on the longitudinal free ends of first and second wristband segments 4, 5, respectively. Segments 4, 5 include first and second electrically conductive strips 11, 12 generally enclosed within molded insulative band bodies 13, 14, respectfully. When coupled together with clasp 6, strips 11, 12 form a receiver antenna. The strips are formed of thin resilient metal such as stainless steel. The outer surfaces of the metal strips should be smooth to minimize the effective length along which the received RF signal must travel to the receiver.

Figures 4A, 4B:
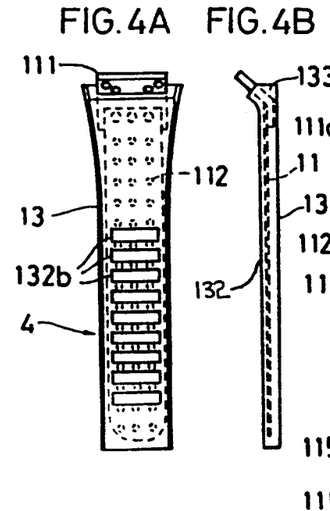
FIGS. 4A and 4B depict inner and lateral sides, respectively, of a first segment of the wristband assembly of FIG. 1.

As shown in FIGS. 4A and 4B, the first wristband segment 4 comprises conductive strip 11 integrally layered within molded insulative band body 13. Band body 13 is formed of nonconducting material, preferably a molded flexible plastic suitable for contact with human skin, for insulating the conductive strip 11 from the wearer's skin and for avoiding adverse electrical contact with foreign objects. The band-body 13 is generally an elongated rectangular shape and has a proximal end 133 obtusely angled to the inner side.

Figures 5A, 5B:
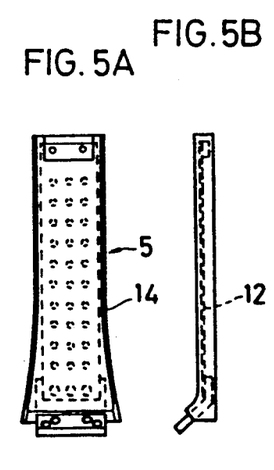
FIGS. 5A and 5B illustrate inner and lateral sides, respectively, of a second segment of the wristband assembly of FIG. 1.

Band body 13 is formed by sandwiching strip 11 between outer side layer 131 and inner side layer 132. Outer side layer 131 has a solid or unbroken outer surface. Inner side layer 132 has an inner surface patterned with an array of rectangular indentations defining a series of spaced transversely and longitudinally raised ridges 132a. Inner side layer 132 includes a plurality of rectangular openings 132b extending in the lateral direction for exposure of strip 11 and is electrically connected with strip 12 by means of clasp 6 to form a receiver antenna. Conductive strip 11, enclosed within band body 13, is welded at its proximal end to an obtusely angled rectangular mounting bracket 111 projecting from the proximal end 133a of the band body. Band body 13 is also fixed to receiver housing 2 at bracket 111. Conductive strip 11 is formed with a plurality of round holes 112 arranged in three lines along the longitudinal direction of band body 13. Wristband segment 5, shown in FIGS. 5A and 5B, is of substantially the same construction as that of wristband segment 4.

Figures 6A, 6B:
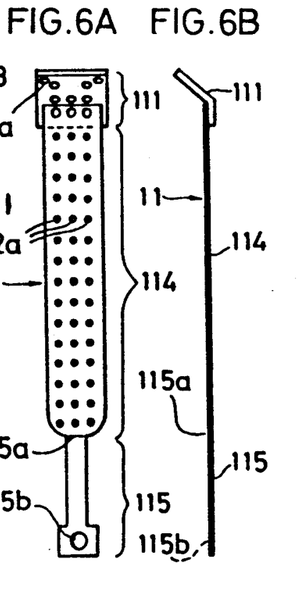
FIGS. 6A and 6B are inner-side and lateral-side views, respectively, of an electrically conductive strip of the wristband segment of FIG. 4A.
Figure 7A:
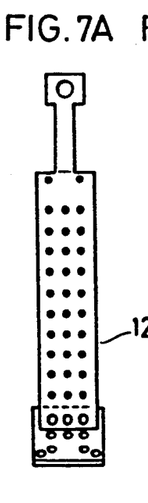
FIGS. 7A and 7B are inner-side and lateral-side views, respectively, of an electrically conductive strip of the wristband segment of FIG. 5A.
Figure 7B:
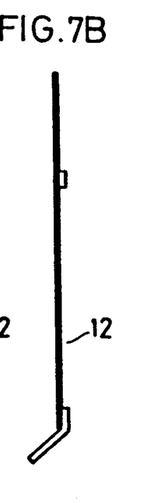
Figure 10A:
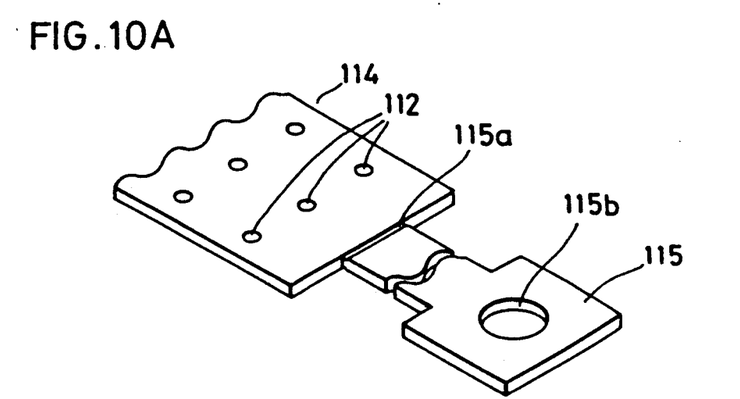
FIGS. 10A, 10B and 10C are perspective views of alternative tags having alternative cut-away line structures for separation of the tag from the electrically conductive strip.

Conductive strip 11 is made of stainless steel having a thickness of about 0.05 to 0.2 mm. The strip can be made of other metals compatible with wristband use such as beryllium-copper alloy or silver or copper plated metal. As shown in FIGS. 6A and 6B, strip 11 comprises strip body 114, mounting bracket 111 welded to the proximal end of the strip body, and a tag 115 extending from the distal end of strip body 114. The boundary between tag 115 and strip body 114 is defined by groove 115a as seen in FIG. 10A. Tag 115 can be easily removed from strip body 114 along groove 115a. The end of tag 115 includes round hole 115b for engagement with a pulling mechanism. Strip body 114 includes a plurality of round holes 112a and bracket 111 defines a plurality of screw holes 111a.

Figure 8:
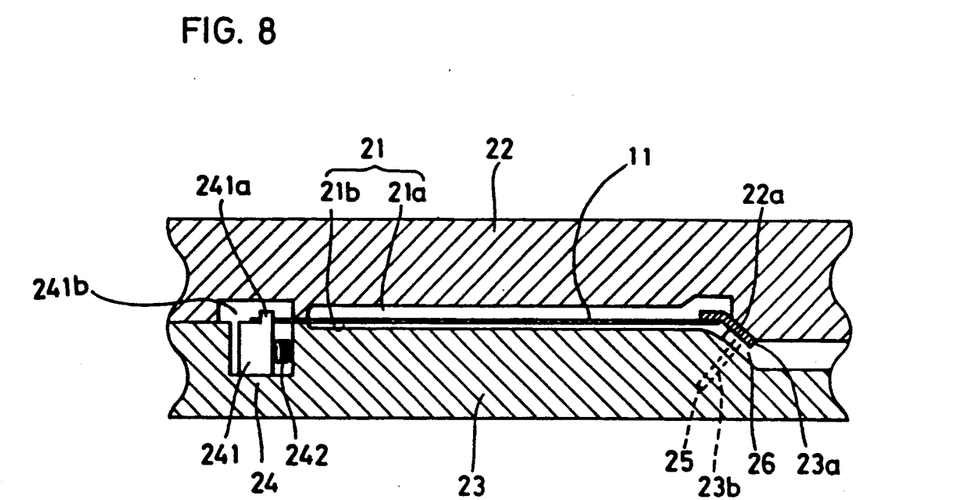
FIG. 8 illustrates a single injection molding arrangement according to the present invention for the manufacture of the wristband segment of FIGS. 4A and 4B.

Referring to FIG. 8, strip 11 is placed in injection molding cavity 21 defined by upper mold 22 and lower mold 23. Upper mold 22 defines a cavity 21a for outer side layer 131 of band body 13. Lower mold 23 defines a cavity 21b for inner side layer 132 of band body 13. Lower mold 23 includes pulling mechanism 24 comprising block piece 241 slideably mounted in cavity 241b of mold 23 and movable in the longitudinal direction of mold cavity 21. The top of block piece 241 includes upright pin 241a which is engageable with round hole 115b of tag 115. Pulling mechanism 24 includes a compressed coil spring 242 inserted between mold 23 and block piece 241 for applying a predetermined force away from cavity 21 to block piece 241. Molds 22, 23 include faces 22a, 23a at the opposite side of pulling mechanism 24 between which bracket 111 is placed and nipped. Lower portion 23a defines hole 23b for inserting positioning pin 25. Face 23a of lower mold 23 forms gate 26 through which molding material is injected into cavity 21. Gate 26 is about 4 mm wide and thinner than lower layer 132 of proximal end 133 of the band body.

Strip 11 is placed in cavity 21 in such a manner that bracket 111 is fixed by positioning pin 25 inserted through screw hole 111a of the bracket and hole 23b of lower mold 23. Strip 11 is nipped by faces 22a, 23a of molds 22 and 23, while tag 115 is engaged by pin 241a of block 241. Thus, strip 11 is fixed at its proximal end on the bracket side and is pulled at the opposite end on the tag side by pulling mechanism 24, thereby setting strip 11 in a tensile condition.

After strip 11 is set in the cavity, molding material, such as two-part silicone rubber, is injected into cavity 21 through gate 26. Other insulating organic materials, such as urethane rubber or thermoplastic elastomers, may also be employed as the molding material. During injection of the molding material, the tensile condition of strip 11 inhibits deformation or deflection from the force of the injected material. Therefore, injection molding of wristband segment 4 is carried out with the strip maintained in a predetermined position, particularly in the thickness direction.

Figure 9:
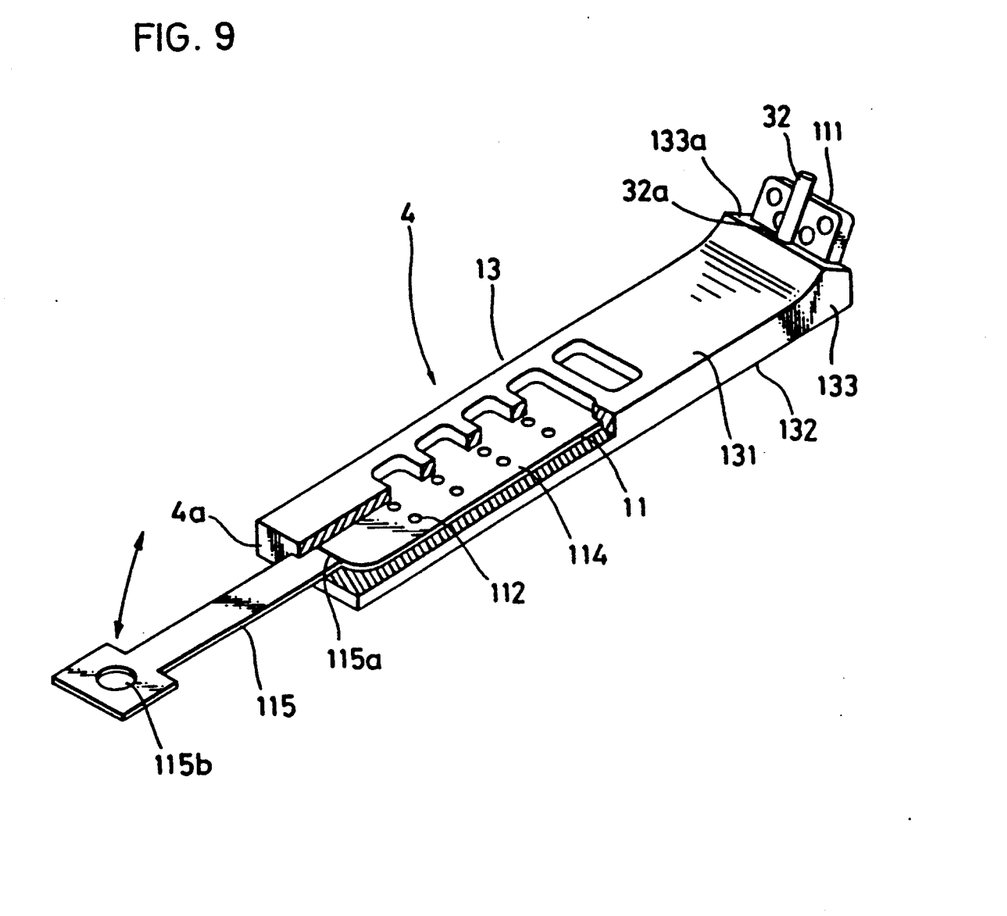
FIG. 9 is a perspective view of a single injection molded wristband segment.

As seen in FIG. 9, the molded wristband 4 has a tag 115 projecting from the longitudinal end 4a. Cut-away line 115a is positioned immediately inside end 4a. Tag 115 is removed by bending in opposite directions along the arrow to create a break along cut-away line 115a. The portion of the strip along cut-away line 115a is sufficiently thin for easy removal of tag 115. At the proximal end of molded wristband 4 there remains a protrusion 32 corresponding to and defined by gate 26 of mold 23. This protrusion 32 is removed along end surface 133a of proximal end 133. The cutting line of protrusion 32 is defined by stepped protrusion 32a formed between proximal end 133 and protrusion 32, so that removal can be conducted easily and precisely. Following removal of tag 115 and protrusion 32, molded wristband segment 4, as shown in FIGS. 4A and 4B, is obtained.

According to the present invention, injection molding of the wristband segment includes tensioning strip 11 by a predetermined force necessary to secure the strip in a desired position within cavity 21 during injection of molding material. Therefore, single injection molding can be adopted in the manufacture of wristband segments having integral flexible strips. Gate 26 of the mold is positioned at the inner side of end surface 133a of proximal end 133. This inner-side end is scarred by the removal of protrusion 32 and potentially degrading the appearance of the outer side of the wristband. This portion, however, is not visible when wristband segment 4 is secured to receiver housing 2. In this embodiment, strip 11 is formed with a plurality of holes 112 which function to increase bonding strength between the strip and molding band body 13.

Figure 10B:
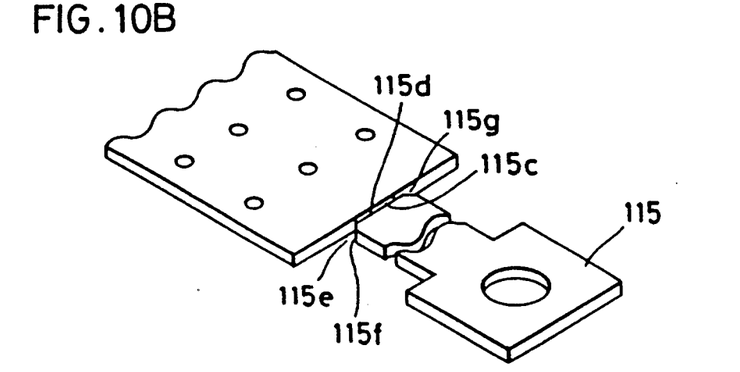
Figure 10C:
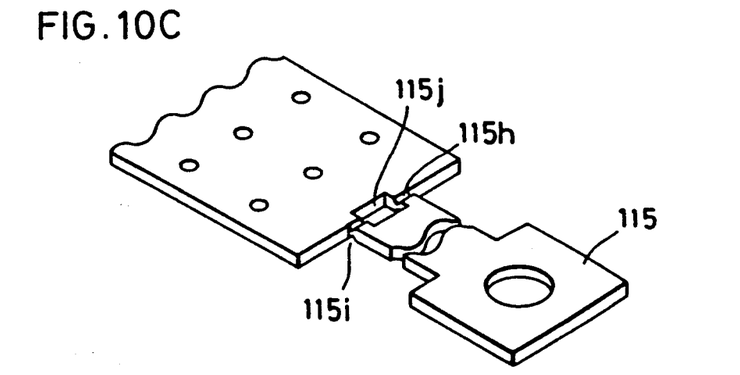

FIG. 10B shows a modification of cut-away line 115a of FIG. 10A, wherein line 115c is defined by V-shaped grooves 115d, 115e formed on the both surfaces of tag 115 and cutouts 115f, 115g formed at both lateral ends of tag 115. FIG. 10C shows another modification of the cut-away line defined by V-shaped grooves 115h, 115i, formed on both surfaces of tag 115 and through-hole 115j. In these cut-away line examples, greater stress appears along the cut-away lines by applying a bending force to the tag to facilitate removal.

Figure 11:
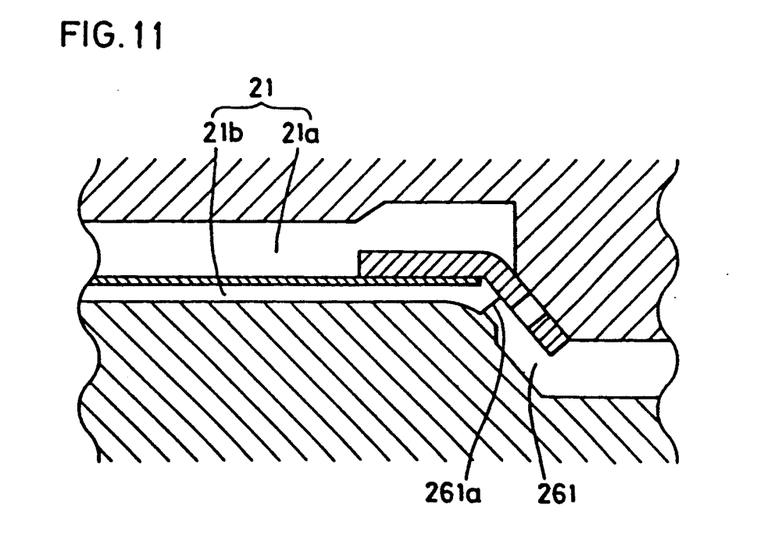
FIG. 11 shows a modified gate of the mold of FIG. 8.

FIG. 11 shows a modified gate 261 formed so that opening 261a facing cavity 21 has reduced cross-section at 261b while the remaining portion is enlarged in size to improve the flow of injected material. Wristband segment 5 is molded by substantially the same process described with reference to wristband segment 4.

Figure 12A:
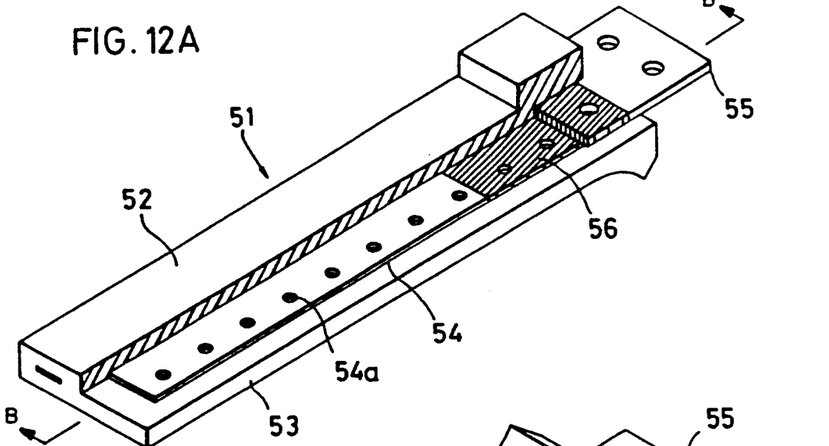
FIGS. 12A and 12B are perspective views, partially cut away, which emphasize the outer and inner sides, respectively, of a wristband segment manufactured according to the present invention.
Figures 12B, 13:
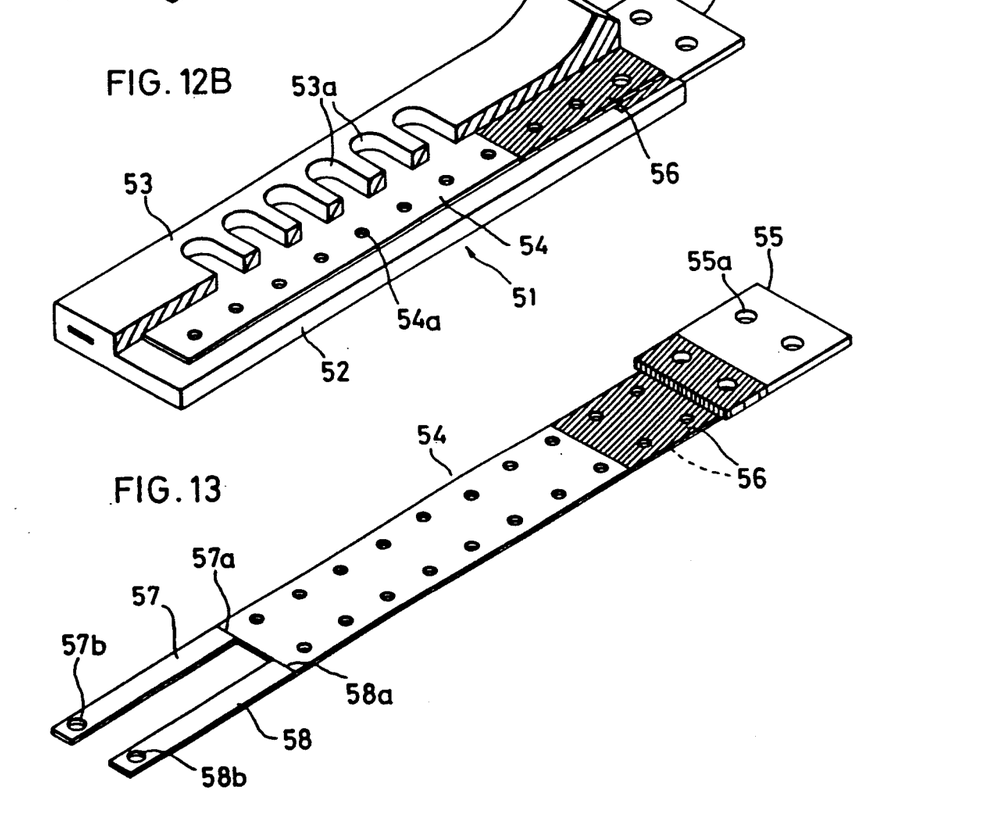
FIG. 13 is a perspective view of the electrically conductive strip of the wristband segment of FIGS. 12A, 12B.

FIG. 12A shows a wristband segment 51, molded according to the present invention, having an electrically conductive strip 54 sandwiched between a molded outer layer 52 and a molded inner layer 53. The strip 54 defines a plurality of round holes 54a and is welded at its proximal end 54b to mounting bracket 55 extending along the longitudinal direction of the strip. Holes 54a increase bonding between the strip and the molded band body. The shape, number and size of the holes can vary according to the application. As shown in FIG. 12B, inner layer 53 of wristband 51 defines a plurality of openings 53a for direct exposure of the strip inserted in the wristband. The unexposed surfaces of strip 54 and bracket 55 are partially coated with an adhesive 56, the preferably coated surface regions being represented by diagonal lines in FIGS. 12A and 12B. The adhesive 56 may be applied to all unexposed surfaces of assembled strip 54 and bracket 55. The exposed surfaces of bracket 55 remain uncoated so as to serve as an electrical conduction path. Where silicone rubber is the molding material for wristband segment 51, a silicon type primer which bonds to silicone rubber when cured, such as a silane coupling agent, is a preferred adhesive. Wristband segment 51 can be adopted for receiver 1 of FIG. 1.

As shown in FIG. 13, the distal end of strip 54 is formed with two tags 57, 58 which can be easily severed from strip 54 along cut-away lines 57a, 58a, respectively. The cut-away lines are of the same structure as shown in FIG. 10A. Tags 57, 58 are removed following injection molding. Tags 57, 58 have respective holes 57b, 58b for pulling strip 54 with a predetermined force during single injection molding.

Figure 14:
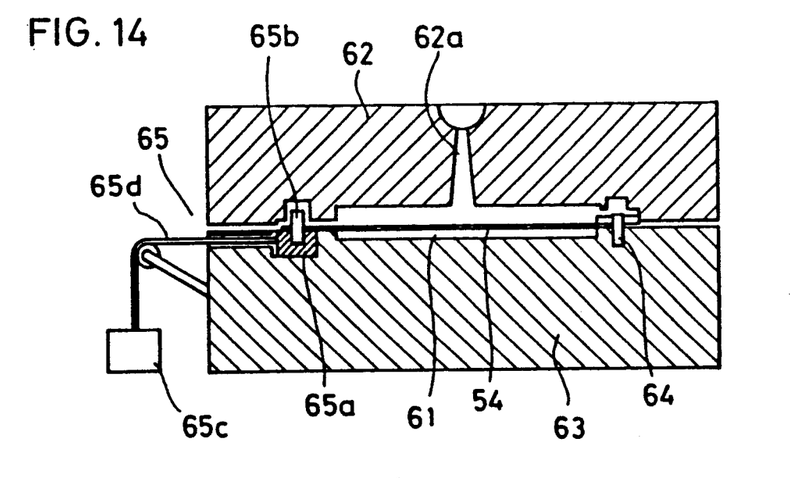
FIG. 14 depicts a single injection molding arrangement of the present invention for the manufacture of the wristband segment of FIGS. 12A, 12B.
Figure 15:
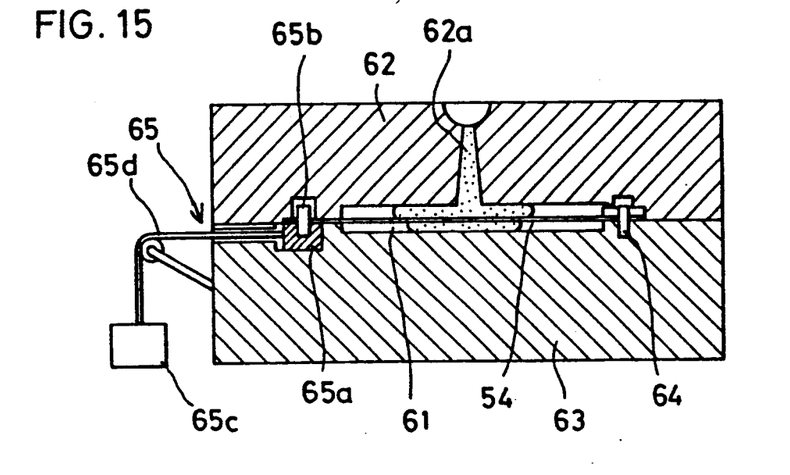
FIG. 15 illustrates the single injection molding arrangement of FIG. 14 during injection of molding material.

FIG. 14 illustrates cavity 61 defined by upper mold 62 and lower mold 63 for molding wristband segment 51. Strip 54 is illustrated in cavity 61 having the proximal end fixed to the lower molds by a pair of positioning pins 64 and the distal end pulled by mechanism 65. Pulling mechanism 65 has a slideable block 65a with a pair of pins 65b engageable with respective holes 57b, 58b of tags 57, 58, and a weight 65c connected by means of a tension wire 65d to block 65a. Block 65a is pulled by weight 65c thereby setting the strip 54 in a tensile condition. Upper mold 62 is provided with a sprue gate 62a communicating with the cavity at a longitudinal middle portion for injection of molding material into the cavity 61. FIG. 15 shows injection of molding material into cavity 61. Strip 54 is pulled by mechanism 65 so that it is not deformed or deflected by the pressure of the injected material. Therefore, the strip is maintained in a desired position. In addition, where the injected material is two-part silicone rubber and the adhesive 56 is a primer such as a silane coupling agent, the primer chemically reacts with the injected silicone rubber to form a chemical bonding between the strip and the injected silicone rubber during the period the injected silicon rubber in the cavity solidifies. Thus, strip 54 is firmly fixed in molded wristband segment 51.

Adhesive 56 on the strip 54 and bracket 55 may be any adhesive capable of adhering injected silicone rubber to the metal strip 54. The insulative resilient material or molding material can be of other materials such as urethane rubber or thermoplastic elastomer, in which case the adhesive is selected from those compatible with the selected molding material. The regions coated with adhesive 56 may also be varied. For example, the enclosed surface areas of strip 54 and bracket 55 may be thoroughly coated with adhesive 55.

Figure 16:
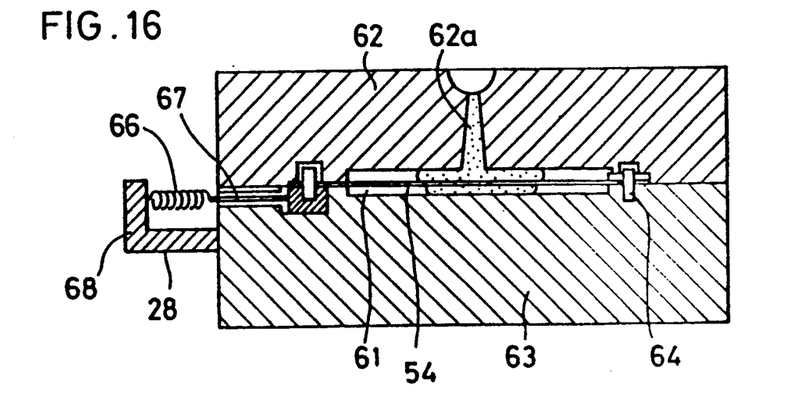
FIG. 16 illustrates an alternative single injection molding arrangement during injection of molding material.

FIG. 16 shows another example of the pulling mechanism, wherein the pulling force of strip 54 is exerted by a coil spring 66 between tension wire 67 and bracket 68 mounted on lower mold 63. With this pulling mechanism embodiment, it was found that the same results obtained by pulling mechanism 65 of FIG. 14 can be obtained. Hydraulic and air cylinder pulling mechanisms can also be adopted.

Figure 17:
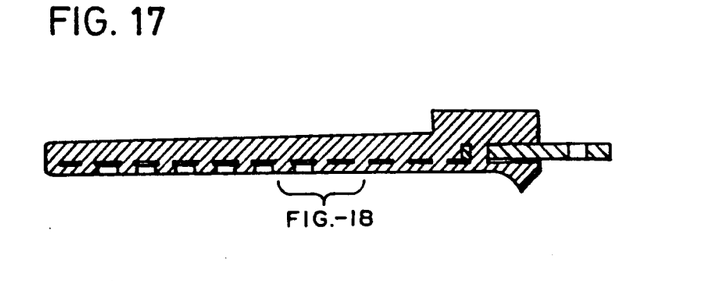
FIG. 17 is a sectional view taken along line B—B of FIG. 12A.
Figure 18:
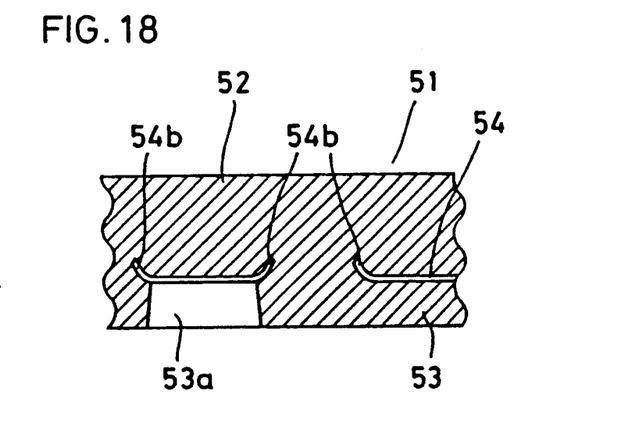
FIG. 18 is an exploded view of the designated portion of FIG. 17.

The strip 54 employs a plurality of round holes formed in the strip to increase bonding between the strip and the surrounding molded band body. As shown in FIG. 17, the molded material fills the holes where the upper and lower layers 52, 53 are integrally connected. These molded portions in holes 54 would tend to be sheared where the inner edges of holes 54 are facing when bending forces are applied to the wristband. Thus, it is preferable, as shown in FIG. 18, that inner edge-portions 54b of holes 54a are bent to form an accurate shape in the thickness direction of the wristband, thereby avoiding such shearing.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for injection-molding a wristband embedded antenna comprising the steps of:
   a. providing a flexible electrically conductive member having a removable tag projecting from one longitudinal end of said member and an end portion projecting from an opposite end of said member;
   b. forming a molding cavity from a pair of molds and further forming a gate, positioned on an inner wristband side, for injection of a molding material;
   c. securing said member within said molding cavity such that said member is nipped between said pair of molds;
   d. applying a tensile force to said member;
   e. injecting a molding material into said cavity concurrently with step d;
   f. releasing said tensile force following step e; and
   g. severing said tag from said conductive member inside the molded wristband after step f such that any unremoved tag portion remains unexposed at the wristband end.

2. The method of claim 1, wherein an adhesive is applied to at least a portion of at least one surface of said flexible member prior to step e.

3. The method of claim 1 wherein said tensile force is applied to said tag projecting from one longitudinal end of said member and projecting beyond said molding cavity.

4. A method of injection-molding a wristband as set forth in claim 1, wherein said end portion is disposed between opposing regions of the upper and lower faces of injection molds defining said molding cavity, and wherein said opposing regions of said molds define a part of said cavity corresponding to the wrist side of said wristband and include a gate through which the molding material is injected into said cavity.

5. A method of injection-molding a wristband as set forth in claim 1, wherein said conductive member defines a plurality of holes for increasing the bond of said conductive member to said molding material injected into said cavity.

6. A method of injection-molding a wristband as set forth in claim 1, wherein said conductive member is coated on at least one surface with adhesive for bonding said conductive member to said molding material injected into said cavity.

7. A method of injection-molding a wristband as set forth in claim 1, wherein said conductive member is fabricated of stainless steel having a thickness in the range of about 0.05 mm to 0.2 mm.

8. A method of injection-molding a wristband as set forth in claim 1, wherein said molding material is two-part silicone rubber and said adhesive is a primer of a silane coupling agent.

9. A method of injection-molding a wristband as set forth in claim 4, wherein said tag is cut away following injection from said conductive member along a cut-away line positioned immediately inside the molded wristband.

10. A method of injection-molding a wristband as set forth in claim 9, wherein said cut-away line is a groove on said conductive member.

11. A method of injection-molding a wristband as set forth in claim 10 wherein said conductive member defines a plurality of holes.

12. A method of injection-molding a wristband as set forth in claim 11, wherein said conductive member is coated on a portion of at least one surface with adhesive for bonding said conductive member to said molding material injected into said cavity.

13. A method of injection-molding a wristband as set forth in claim 12, wherein said molding material is two-part silicone rubber and said adhesive is a primer of a silane coupling agent.

* * * * *